US005435197A

United States Patent [19]

Telimaa et al.

[11] Patent Number: 5,435,197

[45] Date of Patent: Jul. 25, 1995

[54] PIPETTE WITH A TIP REMOVER

[75] Inventors: Juha Telimaa, Vantaa; Jukka Tervamaki, Helsinki, both of Finland

[73] Assignee: Labsystems Oy, Helsinki, Finland

[21] Appl. No.: 48,043

[22] Filed: Apr. 19, 1993

[30] Foreign Application Priority Data

Apr. 21, 1992 [FI] Finland ................................ 921765

[51] Int. Cl.[6] ................................ G01N 1/14

[52] U.S. Cl. ................................ 73/864.14

[58] Field of Search ........... 73/864.11, 864.14, 864.18; 422/100

[56] References Cited

U.S. PATENT DOCUMENTS

| | | | |
|---|---|---|---|
| 4,151,750 | 5/1979 | Suovaniemi et al. | 73/425.6 |
| 4,187,724 | 2/1980 | Citrin | 73/425.4 |
| 4,283,950 | 8/1981 | Tervamaki | 73/864 |
| 4,779,467 | 10/1988 | Rainin et al. | 73/864.17 |
| 4,933,291 | 6/1990 | Daiss et al. | 422/100 |
| 5,055,408 | 10/1991 | Higo et al. | 422/100 |
| 5,057,950 | 10/1991 | Torti et al. | 422/100 |
| 5,075,079 | 12/1991 | Kerr et al. | 422/64 |

FOREIGN PATENT DOCUMENTS 0265028 4/1988 European Pat. Off. .

OTHER PUBLICATIONS

European Search Report dated Jul. 30, 1993.

*Primary Examiner*—Robert Raevis

*Attorney, Agent, or Firm*—Armstrong, Westerman, Hattori, McLelland & Naughton

[57] ABSTRACT

A pipette provided with a tip remover, which pipette has a lever mechanism, in which the tip is pressed off the pipette. In this way, it has been possible to decrease the force needed for the loosening.

7 Claims, 3 Drawing Sheets

PIPETTE WITH A TIP REMOVER

FIELD OF INVENTION

The invention relates to step pipettes, which have a separate tip for a liquid to be drawn and a mechanism operable by pressing for removing the tip after usage.

BACKGROUND OF ART

For example the patent publications FR-2287941 (corresponding to the publication U.S. Pat. No. 3991617) U.S. Pat. No. 4009611 and FI-57540 (corresponding to the publication U.S. Pat. No. 4151750) describe pipette tip removal mechanisms. They comprise a removal sleeve sliding on the cylinder part of the pipette and an arm fixed thereto and sliding in the handle of the pipette or on its side. The mechanism is also connected with a spring, which pushes the arm into the upper position. When the arm is pressed downwards, the sleeve loosens the tip fixed to the end of the cylinder.

A disadvantage of the known tip removal mechanisms is the fact that the force needed for the removal of the tip may be quite high, especially in multiple channel pipettes.

GENERAL DESCRIPTION OF INVENTION

The main object of the invention is to provide a pipette tip removal mechanism, which is lighter to use than the known mechanisms. This is achieved by means of ways described in claim 1. Preferred embodiments of the invention are described in the dependent claims.

The most essential aspect of the invention is a lever mechanism, by means of which the force needed for pressing the remover is decreased.

In the best mode, the lever mechanism has a lever projecting sideways from the frame of the pipette, between the ends of which lever is articulated the arm of the remover. The end on the side of the frame of the lever is best formed into a gear, which is in mesh with a toothing in the direction of the arm in the pipette frame.

DETAILED DESCRIPTION OF INVENTION

The invention is next described in more detail. The drawings form part of the written description, and therein FIGS. 1–5 show certain pipettes in accordance with the invention seen from the side and partly in section.

The piston and volume adjusting mechanisms of the pipettes correspond to those described in FI-64752.

Figure 1:
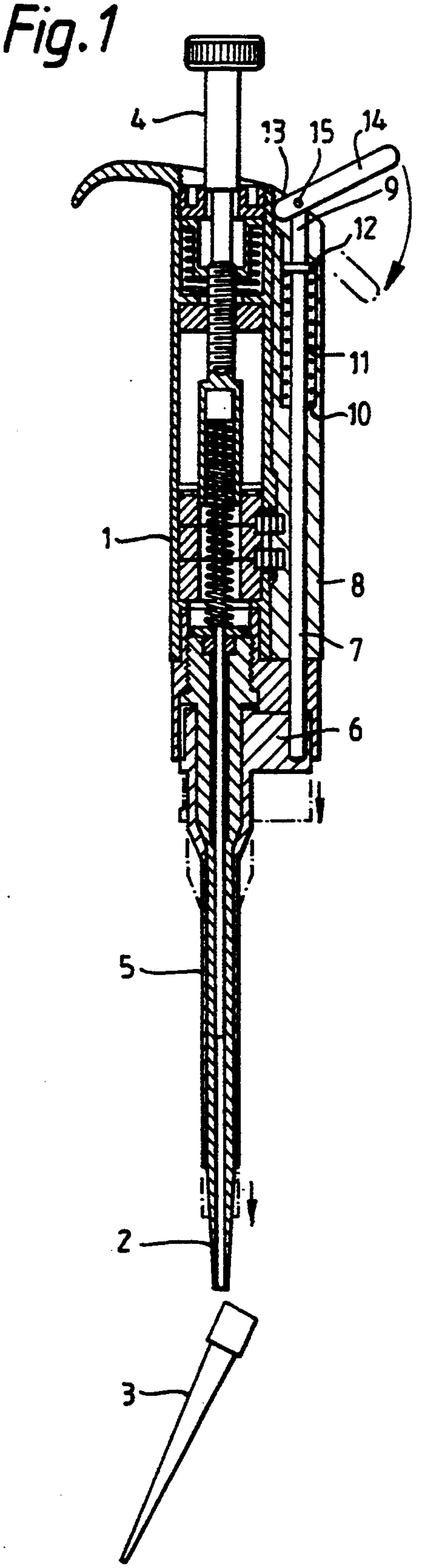
FIGS. 1–5 show pipettes in accordance with the present invention seen from the side and partly in section.

The frame of the pipette of FIG. 1 is comprised of a handle 1 and at its lower end of a narrower jet part 2 which is round by cross-portion and tapers slightly downwards. To the end of the jet part, on its outer surface is fixed by pushing a basically conical tip 3 open at its upper and lower end, into which is sucked and from which is removed liquid to be dosed by means of a piston movable in a cylinder inside the jet part. The tip 3 is tightly fixed to the outer surface of the jet part 2 by means of friction. As an extension of the piston rod is provided a press button 4 extending outside the upper portion of the handle.

The pipette may have piston moving mechanisms, and calibration, volume control and multiple-dose mechanisms of a desired type. Such functions and mechanisms have been described e.g. in the patent publications FI-47461 (=U.S. Pat. No. 3,810,391), FI-57542 (=U.S. Pat. No. 4,284,604), FI-60137 (=GB-2045641), FI-64752 (=U.S. Pat. No. 4,554,134), FI-77166 (=EP-143796), FI-73368 (=EP-172508), FI-84144 (=U.S. Pat. No. 5,002,737) and U.S. Pat. No. 4988481, which publications are incorporated in this description by reference.

On the jet part 2 a slidable sleeve 5 is fitted. In its upper position, the lower edge of the sleeve 5 is located above the upper edge of the jet 3 fixed to the jet part 2. In the upper part of the sleeve 5 there is provided a side extension 6, to which a remover arm 7 in the direction of the frame is fixed. The arm 7 moves on the surface of the handle 1 along a groove. In the upper end of the arm 7 there is provided an extension 9.

On the handle 1 under the groove 8 in its upper end there is a longitudinal dent 10 and therein a spiral spring 11. Above the spiral spring 11, the arm 7 has a spring retainer 12.

In the upper part of the handle 1 under the arm 7 there is a support dent 13, in which is placed one end of a lever 14 moving in the vertical plane and parallel with the extension 6. The lever 14 is journalled on the arm 7 at a point 15 of the extension 9.

When the lever 14 is pressed, the sleeve 5 moves downwards by the action of the arm 7 and pushes off the tip 3 in the jet part 2. When the lever 14 is released, the spring 11 returns the lever to its upper position and a new tip 3 may be inserted into the jet part 2.

By means of the lever 14, the hand power needed for pressing off the tip 3 can be decreased. In this way, the tip 3 may also be fixed more tightly and more compactly. The tip 3 is best fixed by pushing the jet part of the pipette into a tip located in a stand.

Figure 2:
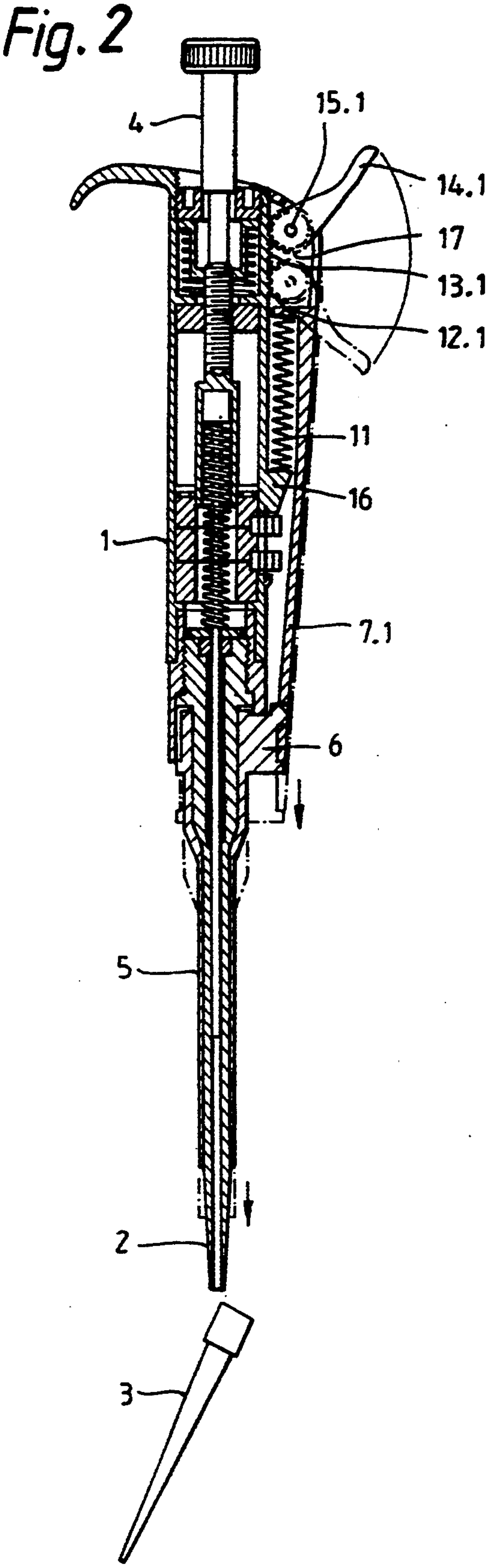

In the application according to FIG. 2, a hollow box-like arm 7.1 resiliently sliding on the side of the handle 1 is fixed to the side extension 6. The handle 1 has under the arm 7.1 a spring support extension 16, into which the lower end of a spiral spring 11 is fitted. The upper end of the spring 11 is against an inner extension 12.1 of the arm 7.1.

On the upper end of the arm 7.1 there is at a point 15.1 a lever 14.1 journalled parallel with the extension 6, the end of which lever 14.1 protrudes outside the arm 7.1 via an opening in the arm.

The inner end of the lever 14.1 is formed into a gear 17. It is in mesh with a toothing 13.1 in the handle 1.

When the lever 14.1. is pressed, the gear 17 moves downwards along the toothing 13.1, and thereby also the arm 7.1 and the sleeve 5 move downwards and loosen the tip 3 from the jet part 2. The ratio of the length of the arm of the lever 14.1 to the mesh diameter of the gear 17 determines to what extent the force needed for pressing the lever is smaller than the friction force holding the tip in place. Most preferably, the force needed for the pressing may be e.g. $\frac{1}{3}$–$\frac{1}{4}$ of the friction force.

Figure 3:
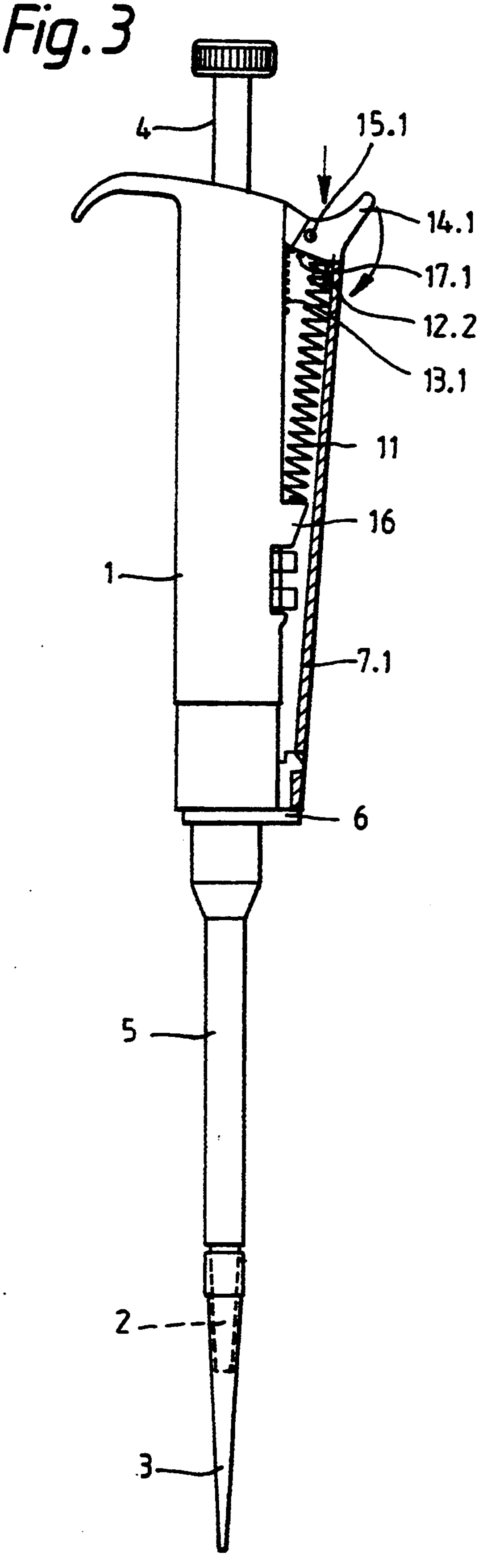

FIG. 3 shows a further development of the pipette according to FIG. 2. In the figure, the gear 17.1 of the inner end of the lever 14.1 is during the initial movement of the lever not in mesh with the toothing 13.1. After the sleeve 5 collides with the upper edge of the tip 3 fixed to the jet part 2, the gear 17.1 engages the toothing 13.1 and the lever 14.1 starts turning on the arm 7.1. The upper end of the spring 11 contacts an extension 12.2 on the lever 14.1.

An additional advantage of the application according to FIG. 3 is the fact that the idle movement before the removal of the tip 3 is rapid and short.

Figure 4:
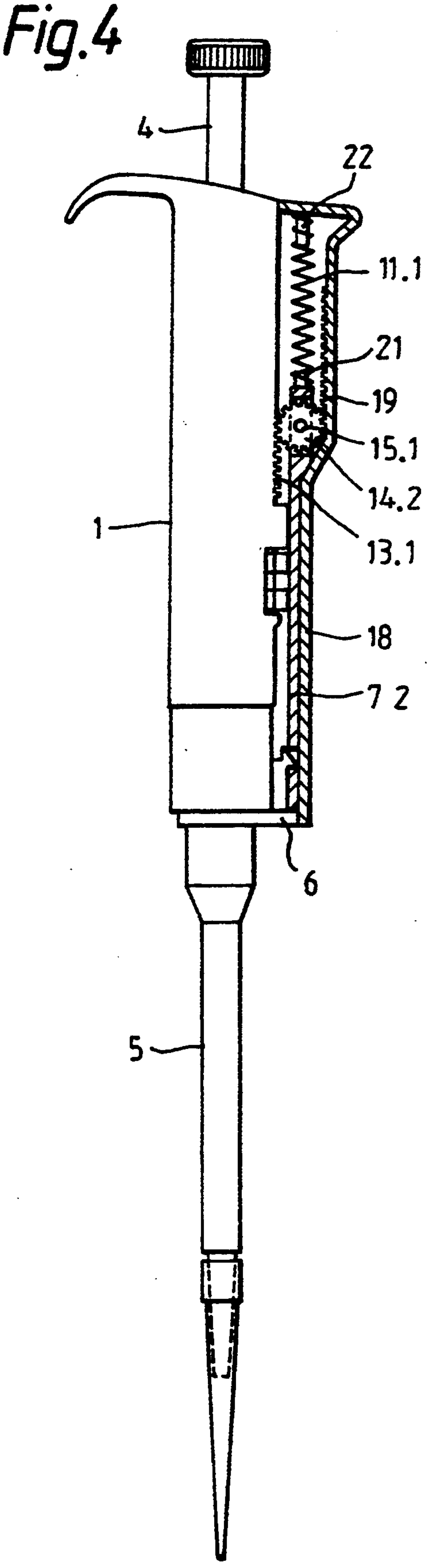

In the application according to FIG. 4, an arm 7.2 is fixed to the side extension 6 of the sleeve 5, onto which arm a gear 14.2 is journalled on a transverse axis 15.1 of the extension. The gear 14.2 is in mesh with a toothing 13.1 on the handle 1. On top of the arm 7.2, on the side of the handle 1 is fixed a hollow, box-like press 18, which is fitted to be slidable between the upper and lower position both relative to the handle 1 and the arm 7.2. The inner wall of the press 18 contains a toothing 19, which is also in mesh with the gear 14.2. Between the upper end 21 of the arm 7.2 and the upper end 22 of the press 18 there is a spring 11.1.

When the press 18 is pressed, the gear 14.2 starts turning downwards along the toothing 13.1 and simultaneously pushes the arm 7.2 and the sleeve 5 downwards, whereby the tip 3 loosens from the jet part 2. The ratio of the movement length of the press 18 to the movement length of the arm is 1:2, and the force needed at the end of the press is thus half the force needed for loosening the tip 3. An advantage of the construction is the fact that it has no part clearly protruding from the handle 1.

Figure 5:
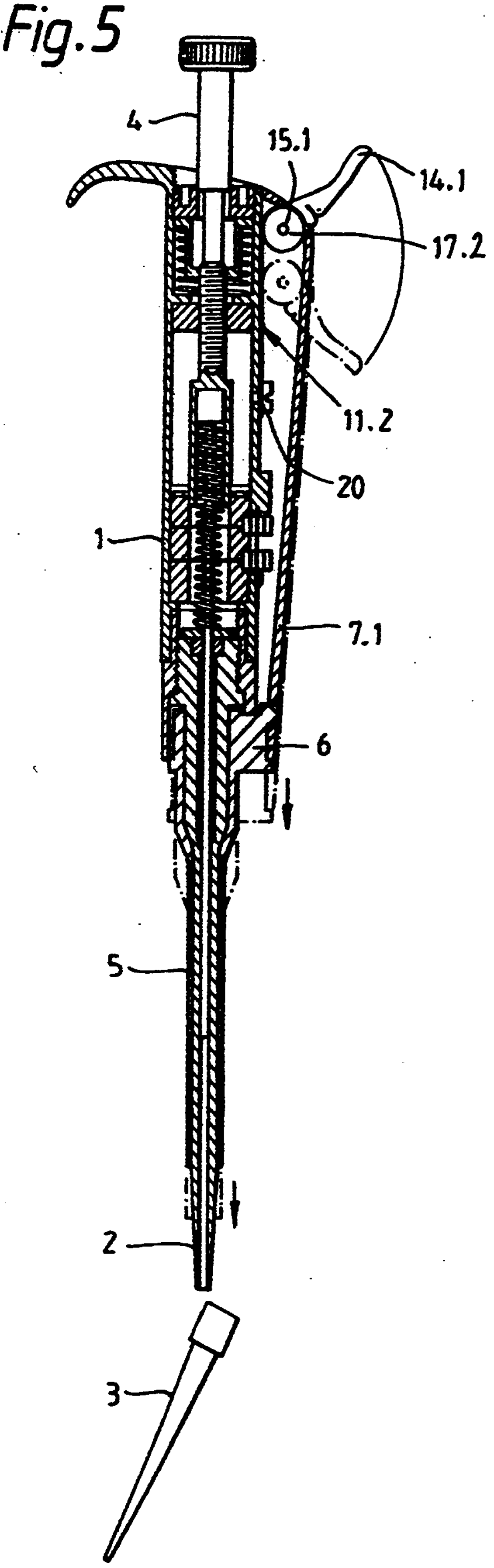

FIG. 5 shows a further application of the pipette according to FIG. 2. The inner end of the lever 14.1 around the axis 15.1 is a round cylinder 17.1. A leaf spring 11.2 is fitted from above around this cylinder so that the other end of the spring goes downwards between the lever and the handle 1 and is fitted therein in point 20. When the lever 14.1 is pressed, the spring 15.1 winds around the cylinder 17.1 and thereby forces the lever to move downwards.

We claim:

1. A pipette provided with a tip remover, which pipette has a longitudinal frame, to the lower end of which is fixed by means of friction a tip acting as a liquid container, comprising:

on the frame, a remover slidable along the frame for pushing the tip fixed to the lower end of the frame off the frame;

as an extension of the upper end of the remover, an arm for sliding the remover along the frame; and a manual lever mechanism protruding sideways from the frame and connected with the arm, by means of which mechanism the arm and the remover may be manually pressed downwards for loosening the tip such that the force needed for the pressing is smaller than the force needed for loosening the tip from the frame, wherein the lever is journalled on the arm and is movable in a vertical plane, the inside end of the lever on the side of the frame is connected to the frame such that when the lever is pressed, the inside end of the lever is forced to move downwards on the frame.

2. A pipette according to claim 1, wherein the inside end of the lever is formed into a gear, and on the frame there is a toothing in mesh with the gear.

3. A pipette according to claim 2, wherein the lever is a gear and that the pipette has a press, which is provided with a toothing, which is in mesh with the gear from outside.

4. A pipette according to claims 1, wherein there is a spring for returning the lever after the loosening of the tip.

5. A pipette according to claim 1, wherein the inside end of the lever is formed into a cylinder leaning against the frame and there is a flexible strip the one end of which is fixed in the lever and the other end of the frame below the lever so that the strip goes around the cylinder and between the cylinder and the frame.

6. A pipette according to claim 5, wherein the strip is a spring for returning the lever after the loosening of the tip.

7. A pipette according to claim 2, wherein in the upper position of the lever, the gear is off the toothing of the frame.

* * * * *